Jan. 2, 1923.
J. H. BASH.
BRAKE OPERATING MEANS.
FILED NOV. 7, 1921.
1,440,902
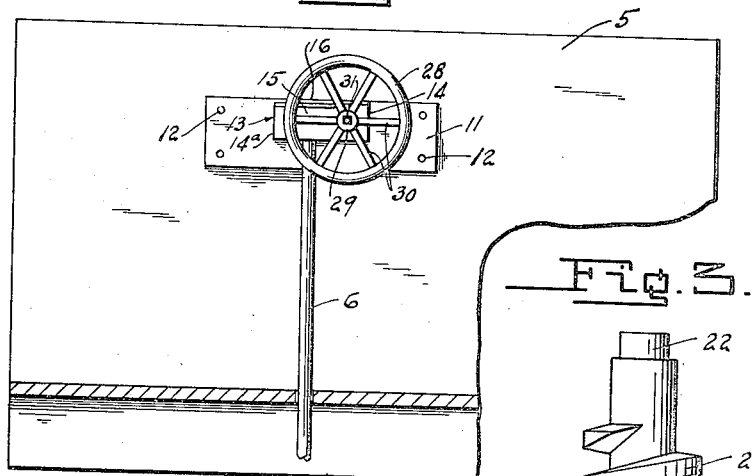
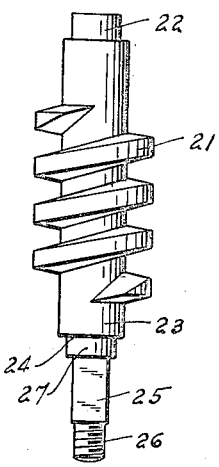
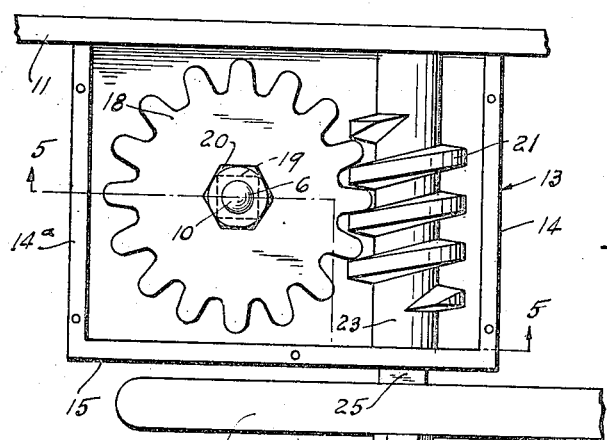
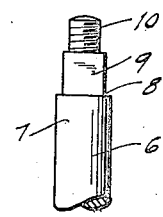
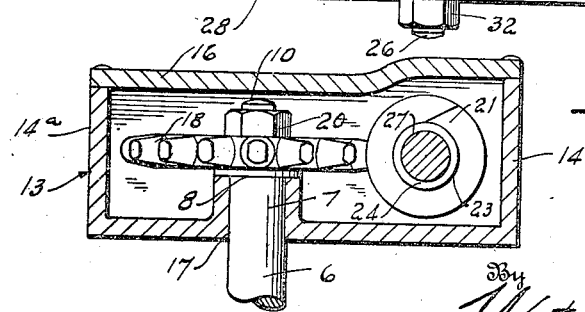
Inventor
J. H. Bash
By Watson E. Coleman Attorney Patented Jan. 2, 1923.

1,440,902

UNITED STATES PATENT OFFICE.

JAMES H. BASH, OF FOXBURG, PENNSYLVANIA.

BRAKE-OPERATING MEANS.

Application filed November 7, 1921. Serial No. 513,496.

*To all whom it may concern:*

Be it known that I, JAMES H. BASH, a citizen of the United States, residing at Foxburg, in the county of Clarion and State of Pennsylvania, have invented certain new and useful Improvements in Brake-Operating Means, of which the following is a specification, reference being had to the accompanying drawings.

This invention relates to brakes and more particularly to brake operating means.

It is an object of the invention to provide means of this character capable of being applied to all passenger and freight railway cars for easily and efficiently applying the brakes and holding said brakes applied indefinitely.

It is another object of the invention to provide means of this character adapted to be used in connection with the conventional form of brake shaft or staff to apply and release the brakes, the operating means not only causing rotation of the brake shaft when manually operated, but preventing accidental rotation of the brake shaft.

It is also an object of the invention to provide means of this character wherein the usual ratchet and pawl holding means is eliminated and the operating means arranged to perform a double function.

It is a further object of the invention to provide means of this character which can be used in connection with an air brake, or conventional form of hand brake mechanism, without requiring alteration of the brake mechanism.

With these and other objects in view, the invention consists in the improved construction and arrangement of parts to be hereinafter more particularly described, fully claimed and illustrated in the accompanying drawings, in which:—

Figure 1 is a view in elevation of a brake operating mechanism, constructed in accordance with an embodiment of the invention;

Figure 2 is a top plan view with the cover of the housing of the mechanism removed;

Figure 3 is a detailed view of the worm gear of the mechanism;

Figure 4 is a detailed view of the upper end of the brake shaft; and

Figure 5 is a section taken on the line 5—5 of Figure 2.

Referring to the drawings, 5 designates a support such as the platform rail or end of a railway car. Projecting through the platform of the car is a conventional form of brake staff or shaft 6, the lower end of the shaft being operatively connected in the usual manner to the brake mechanism, said lower end being journaled in the platform. The upper end 7 of the shaft is reduced to provide a shoulder 8 and substantially rectangular extension 9, the extension being also reduced to provide a threaded stem 10, the purpose of which will be hereinafter described. This brake shaft or staff is not provided with any holding means such as a ratchet and pawl mechanism, so that it is free to rotate in either direction.

A plate 11 is secured to the support 5 at its end by suitable fastening means 12. This plate is relatively long and substantial, while projecting from the intermediate portion of the plate is a housing 13, the housing including sides 14 and 14$^a$ and an end wall 15. The side wall 14 of the housing is greater in width than the side wall 14$^a$, while the end wall 15 has one end portion thereof wider than the opposite end portion. A cover 16 is provided for the housing, said cover conforming to the size and shape of the end and side walls of the housing and may be secured to the housing by any suitable means.

The housing 13 is provided with an opening 17, said opening being located adjacent the small end of the wall 15 and side wall 14$^a$ and is arranged to receive the end portion 7 of the brake shaft 6. A relatively large and substantial gear or cog wheel 18 is provided, said wheel having a central rectangular opening 19 adapted to receive the extension 9 of the brake shaft 6, that portion of the cog wheel adjacent the opening 19 being adapted to engage the shoulder 8 of the shaft 6. A nut 20 is adapted to be threaded on the stem 10 to firmly hold the gear or cog wheel 18 in engagement with the shaft 6, rotation of the gear or cog wheel 18 being impossible in view of the extension 9 and opening 19.

In order to permit rotation of the shaft 6 and application of the brakes, a worm gear 21 is provided, said worm gear having its end portion 22 journaled in the plate 11, while the end portion 23 is reduced to provide a shoulder 24, a rectangular extension 25 and a threaded stem 26. The portion 27 of the end portion 23 is adapted to be journaled in the end wall 15 of the housing, the shoulder 24 engaging the inner face of the wall 15. A hand wheel 28 is provided, said wheel having a hub 29 and spokes 30, said hub having a rectangular opening 31 adapted to receive the rectangular portion 25 of the worm gear 21. A nut 32 is adapted to engage the stem 26 to prevent accidental disengagement of the hand wheel 28 from the worm gear 21.

It is of course obvious that the extension 25 projects beyond the outer face of the end wall 15 so as to space the hand wheel from the housing. In view of the compact arrangement of the housing, there is no danger of the hand of the operator, when engaged with the hand wheel 28, coming in contact with the housing. The worm gear 21 is adapted to mesh with the teeth of the cog or gear wheel 18. The angular relation of the gear wheel 18 and worm gear 21, while permitting operation or application of the brakes, will not rotate accidentally, even when subjected to considerable vibration.

In the operation of the device, the hand wheel is rotated in the direction necessary to apply the brakes. This likewise causes rotation of the shaft 6 through the operative connection of the gear 21 with the cog wheel 18. In view of the particular arrangement of the teeth of the gear wheel, it will be impossible for said gear to rotate independently of the worm gear 21 and in view of the position of the worm gear 21 the cog wheel 18 offers resistance which interferes with the rotation of said worm gear. This operation serves as a lock to hold the brakes in the desired position indefinitely. At the same time, the particular mounting of the worm gear 21 facilitates application of the brakes without any unnecessary strain on the part of the operator. In addition to this, the operating means may be applied to all conventional forms of brakes.

What is claimed is:—

Brake controlling means embodying a housing carried by a support, the bottom of said housing having an opening, a collar surrounding said opening within the housing, a brake actuating shaft disposed substantially in parallel relation to the support and extending through the bottom of said housing, the end of said shaft within the housing being reduced and squared at one portion and reduced and threaded at its extremity, a cog wheel engaged with the squared portion of the shaft and with the collar to hold said cog wheel centrally of the casing, fastening means engaged with said threaded extremity, a shaft extending transversely of the casing to one side and at right angles to the shaft of the brake mechanism, the ends of said shaft being reduced and mounted in bearings, provided in the sides of said casing, one end of said shaft having a reduced squared extension for the reception of a hand wheel, and a worm gear formed on the portion of the shaft within the casing and arranged to engage the teeth of the cog wheel.

In testimony whereof I hereunto affix my signature.

JAMES H. BASH.